(12) United States Patent
Jopling et al.

(10) Patent No.: US 6,771,565 B2
(45) Date of Patent: Aug. 3, 2004

(54) LOW VOLTAGE SEISMIC SOUND SOURCE

(75) Inventors: John Murray Jopling, Bordon (GB); Paul Dominic Forster, Bordon (GB); David Charles Holland, Bordon (GB); Richard Elliot Hale, Bordon (GB)

(73) Assignee: LVB Systems Ltd., Bordon (GB)

( * ) Notice: Subject to any disclaimer, the term of this patent is extended or adjusted under 35 U.S.C. 154(b) by 280 days.

(21) Appl. No.: 10/087,374

(22) Filed: Mar. 1, 2002

(65) Prior Publication Data

US 2003/0165082 A1 Sep. 4, 2003

(51) Int. Cl.[7] ................................................ H04R 1/00
(52) U.S. Cl. ...................... 367/175; 367/142; 181/110; 181/113
(58) Field of Search ............................... 181/113, 110, 181/107; 367/175, 140, 141, 142

(56) References Cited

U.S. PATENT DOCUMENTS

| | | | | |
|---|---|---|---|---|
| 4,463,825 A | * | 8/1984 | Lerwill | 181/113 |
| 4,766,888 A | * | 8/1988 | Oppelt | 367/175 |
| 4,879,993 A | * | 11/1989 | Reichenberger et al. | 601/4 |
| 4,920,955 A | * | 5/1990 | Mahler et al. | 367/175 |
| 4,960,183 A | * | 10/1990 | Young, II | 181/107 |
| 5,251,630 A | * | 10/1993 | Rattner | 367/175 |

* cited by examiner

*Primary Examiner*—Ian J. Lobo
(74) *Attorney, Agent, or Firm*—Jackson Walker LLP

(57) ABSTRACT

A boomer for generating acoustic signals in a marine seismic survey has a frame towed by a survey vessel. A coil is mounted to the frame and a conductive plate is adjacent to the coil. A capacitor is mounted to the frame, and control electronics system delivers an electric charge stored in the capacitor to the coil. The invention obviates the need for heavy conductive cables between the survey vessel and the boomer in conventional systems where the capacitors are carried by the vessel, while maintaining the desirable acoustic properties of the boomer.

11 Claims, 4 Drawing Sheets

LOW VOLTAGE SEISMIC SOUND SOURCE

BACKGROUND OF THE INVENTION

The present invention relates to marine seismic surveying.

Seismic surveys are carried out to investigate the nature of sediment and rock that lie below the surface. These work by sending acoustic signals into the ground and recording the echoes. The pattern and variation in the echoes can be used to assess the strength and stratification of the underlying material. For marine seismic surveys (at sea, on rivers and on lakes), acoustic pulses are generated in the water and the seismic signals travel down through the seabed before the echoes are recorded.

Various acoustic sound sources are used for marine seismic surveys. Sources well known to practitioners include air guns, water guns, explosives, sparkers, boomers and pingers.

A "boomer" sound source is often used in marine seismic surveys. The boomer has an electrical coil that is towed through the water by a survey vessel, with the coil protected from the water by a flexible membrane. FIG. 1 depicts the prior art configuration of a survey vessel 10 towing a boomer coil and plate 14 with a heavy duty power cable 13 having thick insulation. Control electronics and large capacitors are situated a "containment box" 11 on the survey vessel 10. A receiver 12 is towed independently behind the survey vessel 10, or alternatively may be towed with the boomer.

A prior art boomer coil and plate 14 is schematically depicted in FIG. 2 to include a frame 15 housing coil wires 16 of circular cross-section. The insulating flexible membrane is shown at 18 in the figure.

The capacitors on the survey vessel are in a large bank to provide the necessary power source. Discharging the capacitors that have been energised to a high potential difference, typically 3000 Volts to 5000 Volts, generates the acoustic signal as described below. Controlling the discharge of the capacitors in a safe manner requires heavy-duty equipment and cables 13.

The coil 16 is formed into a circular disk next to a conductive plate 17 of approximately the same diameter. The coil and plate are placed in the frame 15. The insulating flexible membrane 18 protects the coil and plate. When the energy from the capacitors on the survey vessel 10 is discharged through the coil, the plate moves ("kicks") away, in accordance with an electromotive effect. This sharp movement passes through the flexible membrane into the water. At this interface between the membrane and the water, the energy converts to a pressure wave (the seismic signal) that travels down through the water and to the underlying sediments and rock. A typical time series of the acoustic pulse measured in the water is shown in FIG. 6.

In principle, an array of sources could be used to focus the acoustic wave vertically below the instrument. However, the coils of conventional boomers have a diameter typically around 1 m. A simple two-by-two array would at least double the size and quadruple the weight. Since this makes the boomer much more difficult to deploy, multiple coils grouped to form a focused array have never progressed beyond test prototypes.

A surface-towed boomer is smaller and simpler to deploy than a boomer designed to tow at depth. In most applications, a surface-towed system provides adequate information on the sediments and rock beneath the seabed. However, in some commercially important cases, the ability to tow the system at depth is beneficial. Present deep-tow boomers and their cable systems are large and heavy, requiring special lifting equipment.

As the capacitors need to be energised to high potential differences, the capacitors are large and heavy. Also, the high potential differences are a possible safety hazard requiring strong safety containment to ensure they can be used in a safe operating fashion. This heavy steel safety container adds to the weight. To cope with the high current that flows each time the capacitors are discharged, the cable connecting the capacitors to the coil is also heavy, both to enclose broad-gauge conductors that can safely handle the large currents and to include adequate insulation. Energy recovery from the coil to recharge the capacitors has been used, but is relatively inefficient due to inductive losses in the power cable.

OBJECTS OF THE INVENTION

It is an object of the present invention to overcome or substantially ameliorate the above disadvantages and/or more generally, to provide an improved configuration of equipment for conducting seismic surveys.

DISCLOSURE OF THE INVENTION

There is disclosed herein a boomer for generating acoustic signals in a marine seismic survey, the boomer comprising:

a frame adapted to be towed by a survey vessel, a coil mounted to the frame, a conductive plate adjacent to the coil, a capacitor mounted to the frame, and a control electronics system for delivering electric charge stored in the capacitor to the coil.

Preferably, the frame is buoyant so as to float at a water surface.

Alternatively, the frame can be designed for deep towing.

Preferably, the coil comprises wires of square or rectangular cross-section.

Preferably, an insulating flexible membrane is attached to the frame adjacent to the conductive plate.

Preferably there is a plurality of capacitors.

Preferably, the control electronics system includes switches and current and potential controllers to regulate energy supplied by the capacitor to the coil.

Preferably multiple coils are situated within the frame to focus the acoustic energy.

There is further disclosed herein a method of performing a marine seismic survey, the method comprising:

towing the above-disclosed boomer behind a survey vessel that also tows a receiver, charging the capacitor, sending a signal to the control electronics system to discharge the capacitor to thereby energise the coil and kick the conductive plate to provide an acoustic pulse, and receiving a reflected signal with the receiver.

Preferably, both potential of the coil and current passing through the coil are controlled and varied, to optimise and tune the acoustic pulse.

Preferably, part of the energy of the coil is recovered to discharge the capacitor without inductive losses along a long power cable.

BRIEF DESCRIPTION OF THE DRAWINGS

A preferred form of the present invention will now be described by way of example with reference to the accompanying drawings, wherein.

DESCRIPTION OF THE PREFERRED EMBODIMENT

Figure 1:
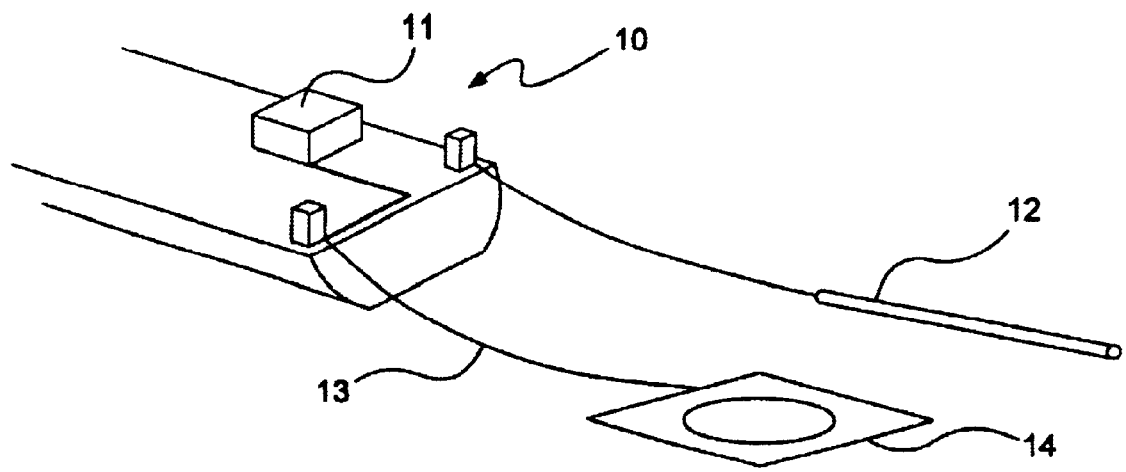
FIG. 1 is a schematic perspective illustration of a prior art marine seismic survey configuration of a vessel, boomer and receiver.
Figure 2:
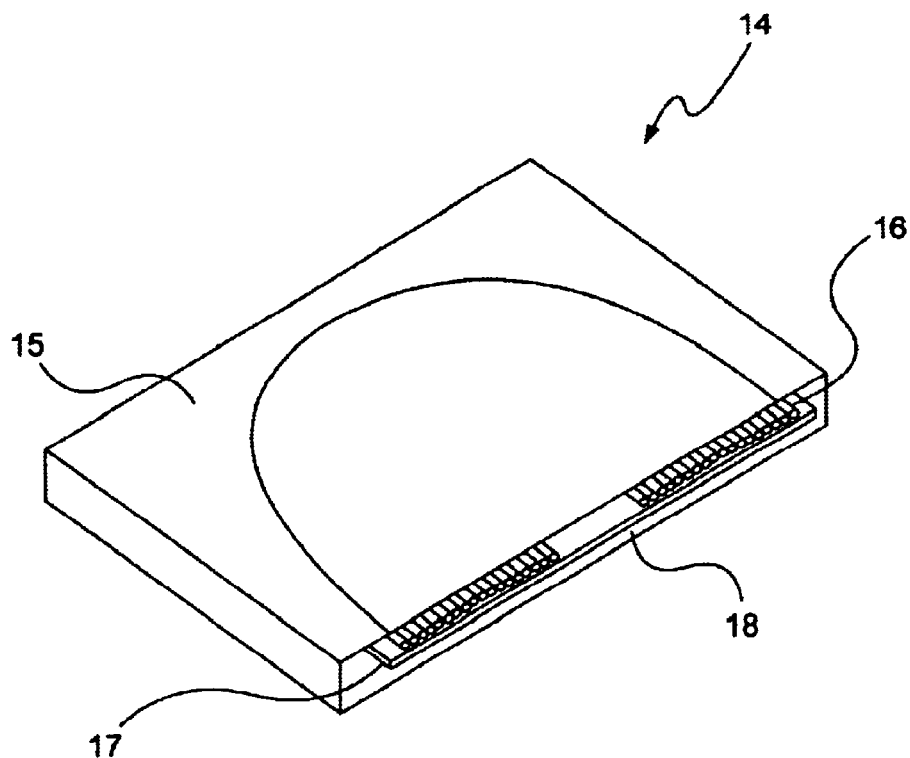
FIG. 2 is a schematic perspective cut-away illustration of a prior art boomer.
Figure 6:
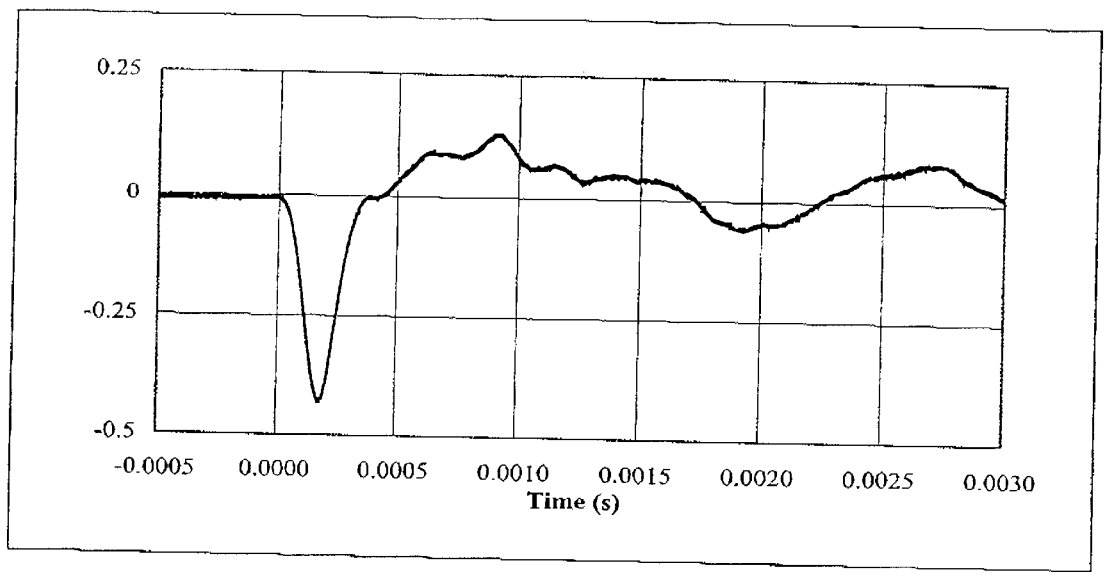
FIG. 6, is an acoustic signature of a typical boomer pulse, operated at 4000 Volts by the prior art boomer of FIG. 2.

FIGS. 1 and 2 of the accompanying drawings have been discussed earlier in reference to the prior art. This is a high voltage configuration that, when used, generates an acoustic signature typically like that depicted in FIG. 6.

Figure 3:
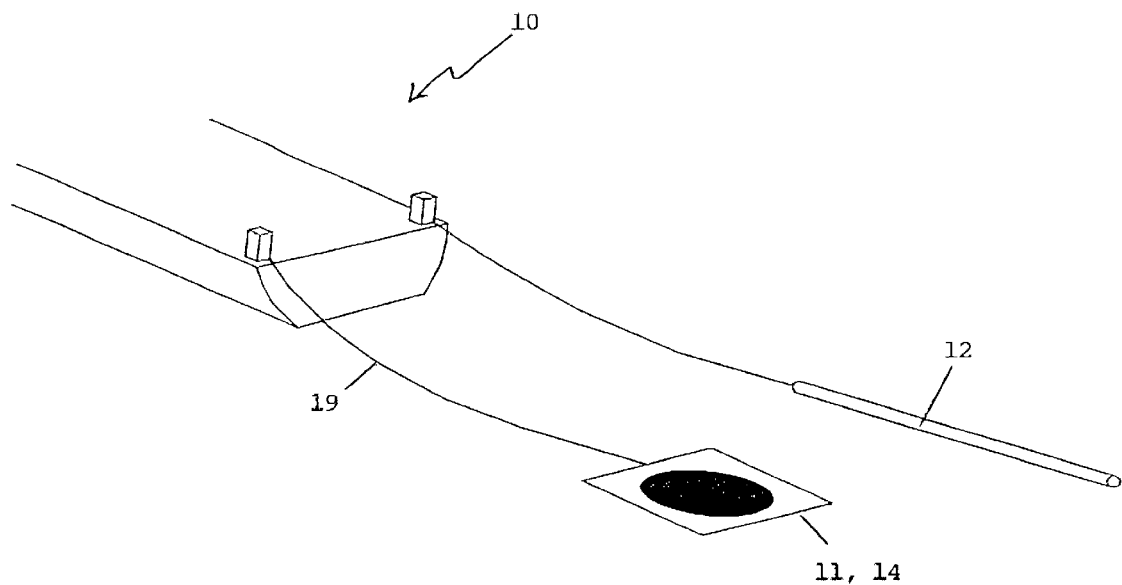
FIG. 3 is a schematic perspective illustration of a new marine seismic survey configuration of a vessel, boomer and receiver.
Figure 4:
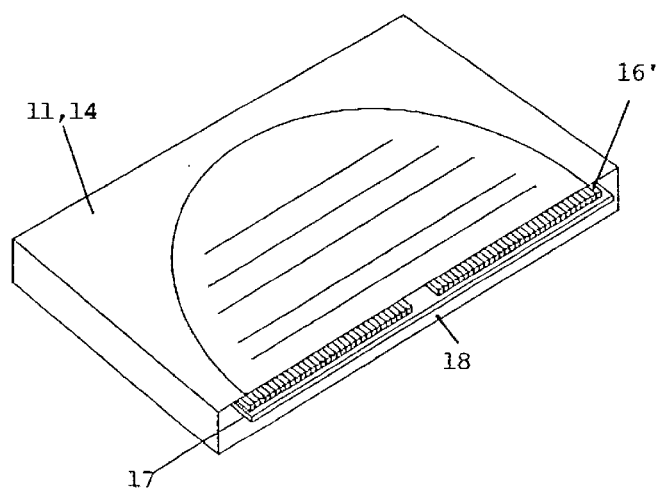
FIG. 4 is a schematic perspective cut-away illustration of a new boomer.
Figure 5:
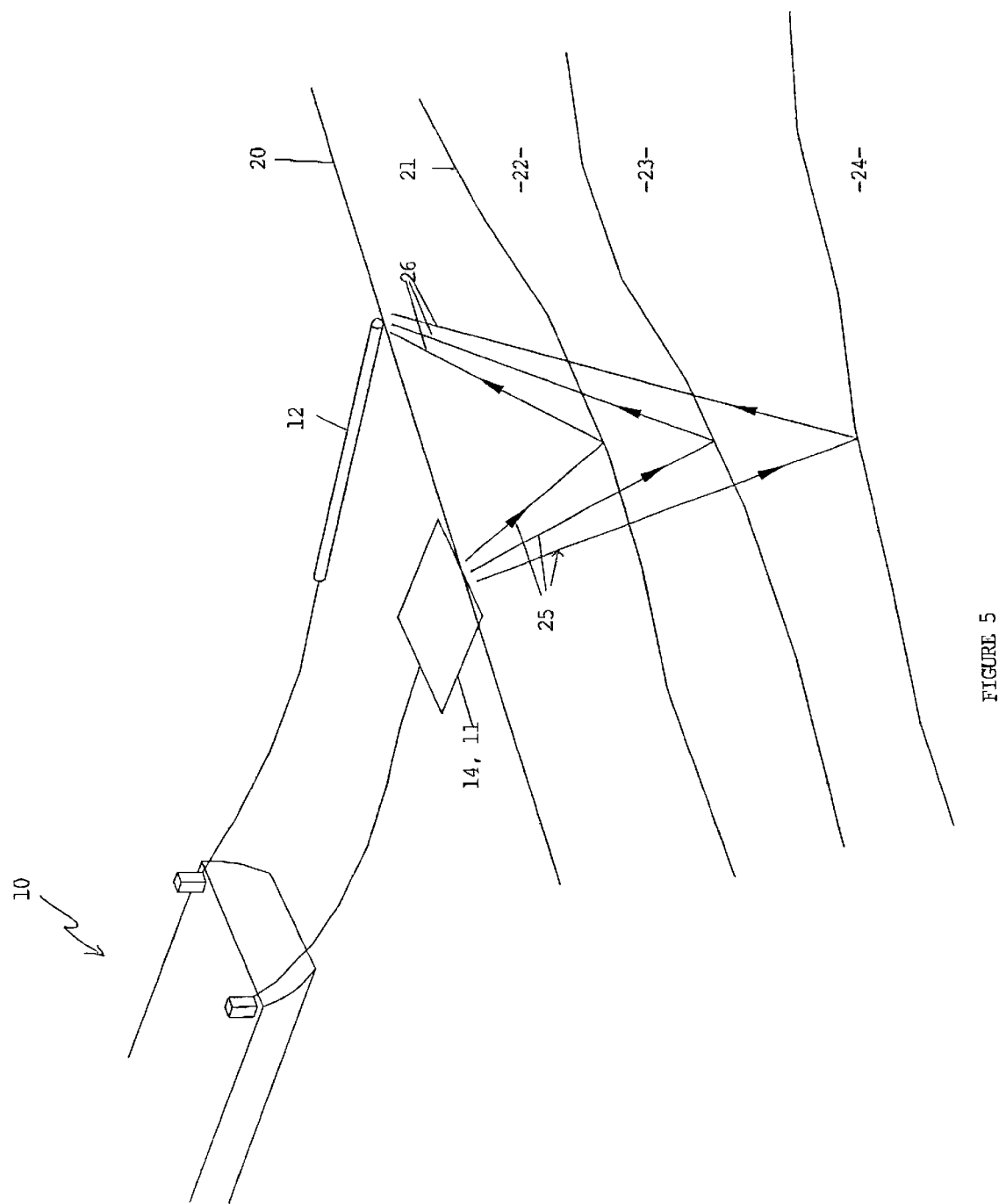
FIG. 5 is a schematic perspective illustration of the marine seismic survey configuration of FIG. 3 including cross-sectional information showing transmitted and reflected acoustic energy.

In the present invention, the preferred embodiment of which is depicted schematically in FIGS. 3 and 4, a boomer frame 14 is towed behind a survey vessel by a lightweight power cable 19 with reduced installation requirements. A receiver 12 is towed independently of the boomer frame 14 in a conventional manner. Electric power is provided from the vessel to the boomer frame 14 via the cable 19.

As shown in FIG. 4, the boomer frame 14 includes a coil 16' of square or rectangular cross-sectioned wires. These are placed adjacent to a conducting plate 17. An insulating flexible membrane 18 is adjacent to the conducting plate 17. Within the frame 14, there is also provided a number of capacitors 11 within the boomer frame. Control circuitry is also provided in the boomer frame for the purpose of discharging the capacitors to thereby "kick" the conductive plate.

The capacitors and control electronics within the boomer frame are close to the plate. The advantage is that instead of sending a sudden surge of high-energy down the towing cable 19 for each acoustic pulse, a lower, steady electric current can be delivered via the cable 19. The lower steady stream of electricity can safely use lighter cables that are easier to insulate and deploy, thereby reducing the weight and cost of the system.

By the use of semiconductors, a proportion of the energy discharged by the capacitors to the coil can be recovered and used to help recharge the capacitors. Since the capacitors are right next to the coil, the inductance of the power cable to the towed system does not reduce the energy recovered. This significantly improves the overall efficiency, so less power has to be supplied from the vessel, further reducing the size and weight of the power cables to the towed system.

The efficiency of the boomer coil per unit volume of the plate depends on the number of turns of coil that the unit volume can contain. The coils of conventional boomers are wire with a circular cross section (see FIG. 2) that has less than optimum package density. The present invention uses wire with a square or rectangular cross-section for the boomer coil, with increased packing density.

Prior art boomers simply discharge their store energy through the boomer plate. The present invention controls and varies both the current and potential passing through the plate's coil, to optimise and tune the acoustic pulse.

Traditionally, the trade-off between improved record quality with focussed arrays of seismic sources and the size and difficulty of deployment of arrays has varied with the type of sound source. For conventional boomers, the increased size and weight has been so much more difficult to deploy that a focused array has not been taken further than unsuccessful prototypes. The present invention is sufficiently more compact that it now becomes practical to use focused arrays of boomer plates in a single towing frame. This could be either a surface-towed or deep towed system.

Figure 7:
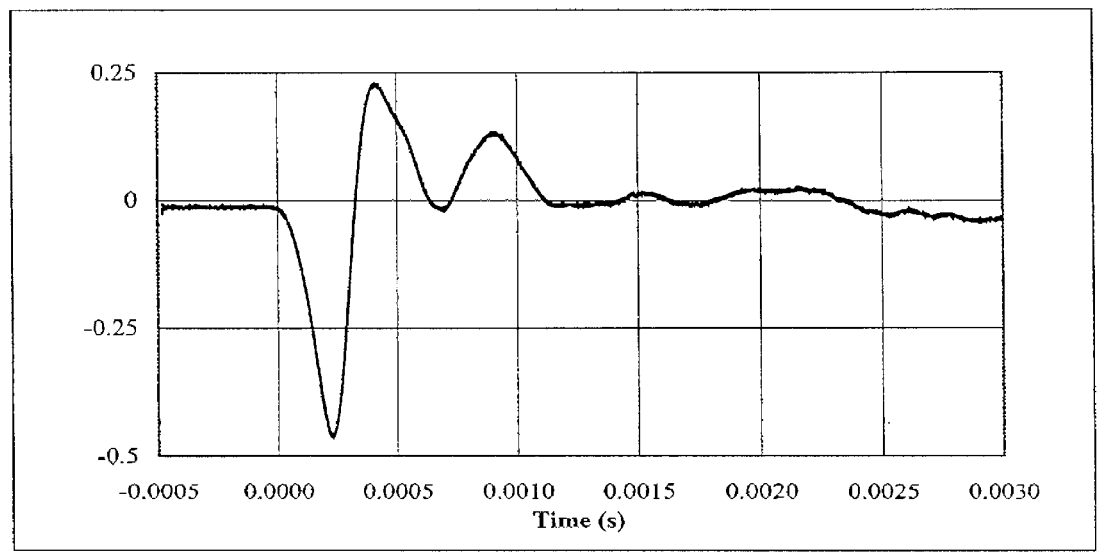
FIG. 7 is an acoustic signature of a pulse from a single-coil, low voltage boomer of FIG. 4 operated at less than 1000 Volts.

FIG. 7 shows the acoustic pulse from a single-coil low voltage boomer, as described above. This uses the same plotting scale as FIG. 6.

It should be appreciated that modifications and alterations obvious to those skilled in the art are not to be considered as beyond the scope of the present invention. For example, triggering signals may be transmitted to the boomer control circuitry via cable 19, or could be transmitted wirelessly.

What is claimed is:

1. A boomer for generating acoustic signals in a marine seismic survey, comprising:
    a frame adapted to be towed by a survey vessel,
    a coil mounted to the frame,
    a conductive plate adjacent to the coil,
    a capacitor mounted within the frame, and
    a control electronics system mounted within the frame for delivering electric charge stored in the capacitor to the coil.

2. The boomer of claim 1 wherein the frame is buoyant, so as to float at a water surface.

3. The boomer of claim 1 wherein the frame is designed for deep towing.

4. The boomer of claim 1 wherein the coil comprises wires of square or rectangular cross-section.

5. The boomer of claim 1 wherein an insulating flexible membrane is attached to the frame adjacent to the conductive plate.

6. The boomer of claim 1 wherein the capacitor is one of a plurality of capacitors.

7. The boomer of claim 1 wherein the control electronics system includes switches and current and potential controllers to regulate energy supplied by the capacitor to the coil.

8. The boomer of claim 1 wherein multiple coils are situated within the frame.

9. A method of performing a marine seismic survey, the method comprising:
    towing the boomer of claim 1 behind a survey vessel that also tows a receiver,
    charging the capacitor,
    sending a signal to the control electronics system to discharge the capacitor to thereby energise the coil and kick the conductive plate to provide an acoustic pulse, and
    receiving a reflected signal with the receiver.

10. The method of claim 9 wherein both potential of the coil and current passing through the coil are controlled and varied, to optimise and tune the acoustic pulse.

11. The method of claim 9 wherein part of the energy of the coil is recovered to discharge the capacitor without inductive losses along a long power cable.

* * * * *